United States Patent
Michels et al.

(10) Patent No.: US 11,749,513 B2
(45) Date of Patent: Sep. 5, 2023

(54) POLYMERIC MATERIALS FOR MALDI IMAGING AND METHOD OF USING THE POLYMERIC MATERIALS

(71) Applicant: KING ABDULLAH UNIVERSITY OF SCIENCE AND TECHNOLOGY, Thuwal (SA)

(72) Inventors: Dominik Ludewig Michels, Thuwal (SA); Franziska Lissel, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 455 days.

(21) Appl. No.: 17/041,025

(22) PCT Filed: Apr. 11, 2018

(86) PCT No.: PCT/IB2018/052549
§ 371 (c)(1),
(2) Date: Sep. 24, 2020

(87) PCT Pub. No.: WO2019/197880
PCT Pub. Date: Oct. 17, 2019

(65) Prior Publication Data
US 2021/0142996 A1 May 13, 2021

(51) Int. Cl.
*H01J 49/04* (2006.01)
*C08L 101/02* (2006.01)
*C08L 101/12* (2006.01)

(52) U.S. Cl.
CPC ........ *H01J 49/0418* (2013.01); *C08L 101/02* (2013.01); *C08L 101/12* (2013.01); *C08L 2201/10* (2013.01)

(58) Field of Classification Search
CPC .. H01J 49/0418; C08L 101/02; C08L 101/12; C08L 2201/10
See application file for complete search history.

(56) References Cited

U.S. PATENT DOCUMENTS

2002/0187312 A1   12/2002   Fonash et al.
2008/0067345 A1   3/2008    Fenn
(Continued)

FOREIGN PATENT DOCUMENTS

GB        2312782 A        11/1997

OTHER PUBLICATIONS

PCT International Search Report and Written Opinion of the International Searching Authority (Forms PCT/ISA/220, PCT/ISA/210 and PCT/ISA/237), dated Dec. 20, 2018, for related International Application No. PCT/IB2018/052549.
(Continued)

*Primary Examiner* — Nicole M Ippolito
*Assistant Examiner* — Hanway Chang
(74) *Attorney, Agent, or Firm* — PATENT PORTFOLIO BUILDERS PLLC

(57) ABSTRACT

A prefabricated polymeric layer to be used in a matrix-assisted laser desorption/ionization (MALDI) based system, the prefabricated polymeric layer including a first sublayer; and a second sublayer attached to the first sublayer, wherein the second sublayer includes a sample holder. At least one of the first sublayer and the second first sublayer includes a polymeric material, and the prefabricated polymeric layer is to be added to a target material to be examined by the MALDI system.

22 Claims, 7 Drawing Sheets

(56) References Cited

U.S. PATENT DOCUMENTS

2014/0323330 A1* 10/2014 Bergo ............... G01N 33/6851
　　　　　　　　　　　　　　　　　　　506/18
2015/0364307 A1* 12/2015 Agar .................. H01J 49/0418
　　　　　　　　　　　　　　　　　　　250/453.11

OTHER PUBLICATIONS

Peterson, D.S., et al., "Porous polymer monolith for surface-enhanced laser desorption/ionization time-of-flight mass spectrometry of small molecules," Rapid Communications in Mass Spectrometry, vol. 18, Issue 13, Jul. 15, 2004 (First published Jun. 3, 2004), pp. 1504-1512.

Soltzberg, L.J., et al., "Small molecule matrix-assisted laser desorption/ionization time-of-flight mass spectrometry using a polymer matrix," Rapid Communications in Mass Spectrometry, vol. 18, Issue 13, Jul. 15, 2004 (First published Jun. 2, 2004), pp. 1455-1458.

* cited by examiner

POLYMERIC MATERIALS FOR MALDI IMAGING AND METHOD OF USING THE POLYMERIC MATERIALS

BACKGROUND

Technical Field

Embodiments of the subject matter disclosed herein generally relate to methods and components for matrix-assisted laser desorption/ionization (MALDI) related devices, and more specifically, to methods and systems that utilize polymer-based materials as components in MALDI mass spectrometry imaging (MALDI MSI) and MALDI mass spectrometry (MALDI MS).

Discussion of the Background

MALDI MSI is an emerging imaging tool that enables one to visualize the spatial distribution of molecules in a tissue sample, for example, derived from a cancer biopsy, or from a structured material surface, for example, a technical component. MALDI MSI is a versatile and highly promising method with high potential for medical, pharmaceutical, biological, environmental and material research, quality control and assessment.

A MALDI system 100 is illustrated in FIG. 1 and its basic functionality is now discussed. On a holding plate 102 (typically made of a metal, e.g., steel) is deposited a target material 104 mixed with a matrix 106, or a target material 104 which is then coated with a matrix material 106. The matrix 106 is typically made of crystallized molecules that include 3,5-dimethoxy-4-hydroxycinnamic acid (sinapinic acid), α-cyano-4-hydroxycinnamic acid (α-CHCA, alpha-cyano or alpha-matrix) or 2,5-dihydroxybenzoic acid (DHB). A solution of one of these molecules may be made as a mixture of water and an organic solvent such as acetonitrile (ACN) or ethanol. A laser device 110 (e.g., UV lasers such as nitrogen lasers having a wavelength of 337 nm) applies a laser beam 112 to the target material and the matrix. Because the matrix 106 is made of a laser energy absorbing material, parts of the matrix and the target material are undergoing ablation and desorption as illustrated by zone 120. Large clusters 122 of the matrix and target material undergo ionization in an ionization zone 124 in the hot plume of the ablated gases molecules. Ions 126 (e.g., molecular ions) are formed in the molecular ions zone 130 with minimal fragmentation. These molecular ions are separated based on their mass and charge in the separation zone 140, and detected by the detector 150 for identifying the ratio of mass over charge (m/z) of the captured ions.

If the holding plate is not made of a metal, then a charge dissipating layer 103 is required between the holding plate 102 and the matrix 106. This is so because the process of shooting a high intensity laser on the matrix/target material mixture creates electrical charges. These charges are a result of the ionization process, which is inherent to the MALDI technique. However, the ionization process is desired only for the charged analytes (i.e., target material) so that they can be separated in the separation zone 140 and detected by the detector 150. The creation of electrical charges next to the holding plate 102 would, to a certain degree, make some charged species of the target material being retained at the surface of the matrix due to the electrostatic interaction, thereby lowering the ionization rate of subsequent laser shots and leading to a broadening of peaks in the energy spectrum.

To prevent this disadvantageous aspect, the charge dissipating layer 103 is added next to the holding plate 102. However, when the holding plate (or sample holder plate) is made of a material that conducts electricity, for example a metal, these plates act as the charge dissipating layer and layer 103 is not necessary.

Shortcomings of the existing MALDI systems are centered on matrix materials, measurement procedures, and software performance. These aspects of the systems need to be solved to implement a widespread use of MALDI MSI. Regarding the chemical and engineering aspects of a MALDI MSI system, new matrix materials are required to improve bandwidth and spatial resolution of the measurements. Further, there is a need for reliable and defined procedures that enable standardized measurements. Ideally, these matrices act simultaneously as matrices and charge-dissipating layers.

The development of "ready-to-use" prefabricated matrix systems would also be desirable. From the computational science, efficient algorithms are needed to handle the extensive data sets generated by MALDI MSI, and to extract, classify and visualize relevant information.

A MALDI MSI system utilizes matrices developed for specific problem sets in regular MALDI MS using a "trial-and-error" approach. The standard matrixes include small conjugated molecules with acidic functions such as cinnamic acid derivatives, which co-crystallize well with protein and lipid samples and efficiently ionize them. These matrixes are comparably volatile and cause numerous peaks in the low-mass region of the mass spectrum due to effects such as clustering. In this regard, FIG. 2A shows a simulated mass spectrum obtained for a given matrix/target material with a MALDI MS. It is noted that peaks 200 corresponding to the matrix and peaks 202 corresponding to the target material overlay in the low-mass region. This problem is amplified by the unfavorable ratio of analyte and matrix, as the matrix is normally used in large excess. Thus, the low-mass region is essentially blackened out by the matrix-related peaks. This means that measurements of low-mass analytes are hindered by the low-mass data generated by the matrix itself. The only exceptions are specific cases (see FIG. 2B) when an exact fit between the molecular mass 202 of the target and the gaps in the matrix related signals 200 occurs.

Thus, the current MALDI MSI and MALDI MS systems cannot accurately measure mixtures of unknown small molecules. However, the small molecules constitute the bulk of cell metabolites, and tracing changes in their occurrence and concentration is especially important in tumor research, as metabolic alterations often precede morphological changes and pathological events in the establishment and propagation of cancer.

Known oncometabolites such as 2-hydroxyglutarate (147 Da, where Da is the Dalton unit of mass) are too small to be reliably detected in MALDI MSI measurements using standard matrices. Also, the expression of ion channels in tumor cells differs profoundly from healthy cells, leading to changes in the intra- and extracellular ion composition. In this regard, a few examples are the markedly high chloride (35 Da) concentration found in glioma brain tumors, and the imbalances of the calcium ion levels found in breast, liver, and stomach cancers.

The ability to trace the concentration and spatial distribution of small molecule metabolites and ions (e.g., less than 500 Da) would be a valuable tool in cancer research, for diagnosis and classification as well as for fundamental research identifying cancer-specific metabolic pathways and investigating drugs able to disrupt them. Matrices allowing the simultaneous analysis of low-mass metabolites (e.g., between 0 and 500 Da) and high-mass proteins (larger than 500 Da) would be especially beneficial, as repeated measurements of the same sample with different matrices are not possible due to changes of the molecular composition and ultimately decomposition of the tissue.

The existing matrix materials also often limit the spatial resolution of the MALDI MSI measurements. Standard MALDI MSI instruments permit a resolution of 20-250 µm, with the new machines offering a spatial resolution down to 10 µm, and research being carried out to achieve even higher resolutions. Yet the instrument resolution has to be matched by the matrix's resolution, which is determined by the matrix crystal size and coating uniformity. Thus, the matrix cover needs to have a crystal density sufficient to allow measurements of the sample surface without gap regions, and the individual crystal has to be small relative to the grid size to avoid creating images that contain artifacts. Also, the matrix cover has to be highly uniform to guarantee reproducibility between samples and even between different positions on the same sample. Further, MALDI measurements take place under ultra-high vacuum conditions. The prolonged measurement times associated with high resolution MALDI MSI experiments require the matrix systems to exhibit profound vacuum stability guaranteeing uniform coating and conditions throughout the measurement.

In addition, it is noted that the skills required for (1) preparing the sample holder, charge dissipating layer, and the matrix and (2) adding the sample to be studied to the matrix, are high and the time for doing this preparation is considerable. Accuracy and reproducibility of measurements strongly depend on the experience and diligence of the user. However, the users of the MALDI devices do not want to invest too much time and energy into acquiring these skills, but they would like to use the MALDI devices and obtain reliable data. Supporting instrumentation, for example automated sprayers, are expensive and space-consuming.

Thus, there is a need for new components for the MALDI MSI and MALDI MS systems that are cheaper and better designed for revealing the structure of a studied material irrespective of its mass size and also easy to use.

SUMMARY

According to an embodiment, there is a prefabricated polymeric layer to be used in a matrix-assisted laser desorption/ionization (MALDI) based system. The prefabricated polymeric layer includes a first sublayer and a second sublayer attached to the first sublayer, wherein the second sublayer includes a sample holder. At least one of the first sublayer and the second first sublayer includes a polymeric material, and the prefabricated polymeric layer is to be added to a target material to be examined by the MALDI system.

According to another embodiment, there is a method for investigating a target material, the method including receiving a preassembled polymeric layer, attaching the target material to the preassembled polymeric layer, wherein the polymeric layer includes a polymeric material, generating a laser beam with a laser device that is part of a matrix-assisted laser desorption/ionization (MALDI) system, irradiating the target material and the preassembled polymeric layer with the laser beam to generate ions, measuring a mass of the ions with a mass spectrometry device of the MALDI system, and visualizing the molecular composition of the target material based on the mass of the ions.

According to still another embodiment, there is a method for preparing a target material to be investigated with a matrix-assisted laser desorption/ionization (MALDI) system. The method includes providing the target material and attaching the target material to a preassembled polymeric layer for being investigated with the MALDI system. The preassembled polymeric layer includes a first sublayer and a second sublayer attached to the first sublayer, wherein the second sublayer includes a sample holder, and at least one of the first sublayer and the second first sublayer includes a polymeric material.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a target material and a polymeric layer. Note that the term polymeric layer means a structure that includes one or more sublayers and at least one of the sublayers includes a polymeric material. This also means that one or more of the remaining sublayers, if present, do not have to include the polymeric material. However, the embodiments to be discussed next are not limited to MALDI MSI systems, but they can be applied to a MALDI MS system or other similar systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a matrix system which is non-volatile, interacts well with the electromagnetic radiation provided by the radiation source (e.g., laser) and promotes desorption and ionization of the analyte(s) (target material) in an efficient fashion, while allowing the measurement of a wide-mass range including both low- and high-mass, is based on polymeric materials.

The inventors have realized that polymeric materials can be used as matrix layers and/or charge dissipating layers in MALDI MSI and as matrix layers and charge dissipating layers and/or sample holder in MALDI MS systems. The utilization of polymeric materials allows provide cheaper solutions, allowing measurements with wide spectral widths, giving smooth surfaces to enable high resolution measurements, allowing to combine the matrix and charge separation layers (and potentially sample holder layer) and enable the prefabrication of these layers.

Figure 3:
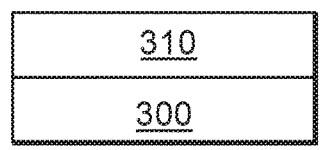
FIG. 3 illustrates the target material coated with a polymeric layer.

According to an embodiment illustrated in FIG. 3, a polymeric layer 300 is used as the matrix, the charge dissipating layer, and the sample holder for a MALDI device. The target material 310 may be added to the polymeric layer 300. In other words, in one application, the polymeric layer 300 is prefabricated and provided to the user of the MALDI device. For example, the user simply buys the prefabricated (preassembled) polymeric layer 300. Then, the user of the MALDI device simply obtains the target material 310 and adds it to the preassembled polymeric layer 300. For example, FIG. 3 shows the target material 310 being already provided over the polymeric layer 300.

Currently, state-of-the-art matrices are applied to the target material using for example spray or drop coating. Based on the chosen physical conditions, the crystals of the matrix formed on the target material, or the crystals of the co-crystallized matrix and target material, have a size around 5-50 µm in size, leading to a rough and discontinuous surface. To achieve higher spatial resolution to match the cell sizes and ultimately be able to map molecular distributions in single cells, materials with a low-surface roughness to prevent artifacts may be used. In this regard, note that a polymeric material forms continuous films with low-surface roughness, and that polymeric materials can be processed into such films with low-surface roughness using different methods, for example, spin-casting or drop-casting.

The process of adding a sample to the prefabricated polymeric layer 300 depends on the kind of sample. For fresh-frozen samples, the sectioned slice is simply deposited on the polymeric layer 300. In general, the tissue is embedded with water. Sectioning (cutting of the sample to slices) occurs at very low temperature (−20° C.) with a fresh-frozen tissue. Then, the tissue section is deposited on the layer 300, which is at room temperature. Due to the difference of the temperature between the sample 310 and the layer 300, the ice in the sample melts and the tissue sections sticks to the layer 300.

Another approach is to apply the tissue section on the layer 300, which is placed at low temperature. Again, the difference in temperature and the water contents between the sample 310 and the layer 300 will make the tissue section to stick to the layer 300. Another alternative is to use an embedding agent such as OCT or carboxymethylcellulose, which will again "stick" the sample 310 to the layer 300.

Beside of fresh-frozen samples, a formalin fixed paraffin embedded tissue may be used. For this approach, the process of sectioning the sample occurs at room temperature, for example, using a microtome. After the sectioning, the tissue section (sample) is deposited on the layer 300, which may be placed onto a heating plate (60° C.) in order to slightly melt the paraffin. Placing the sample 310 on the layer 300 will again lead to the tissue sticking to the prefabricated polymeric layer 300.

Another way of attaching the target material 310 to the matrix/charge dissipating layer/sample holder 300 is dissolving the target material in a suitable solvent and then bringing this solution on the matrix/charge dissipating layer/sample holder 300, for example by drop-casting or spray-coating.

Figure 1:
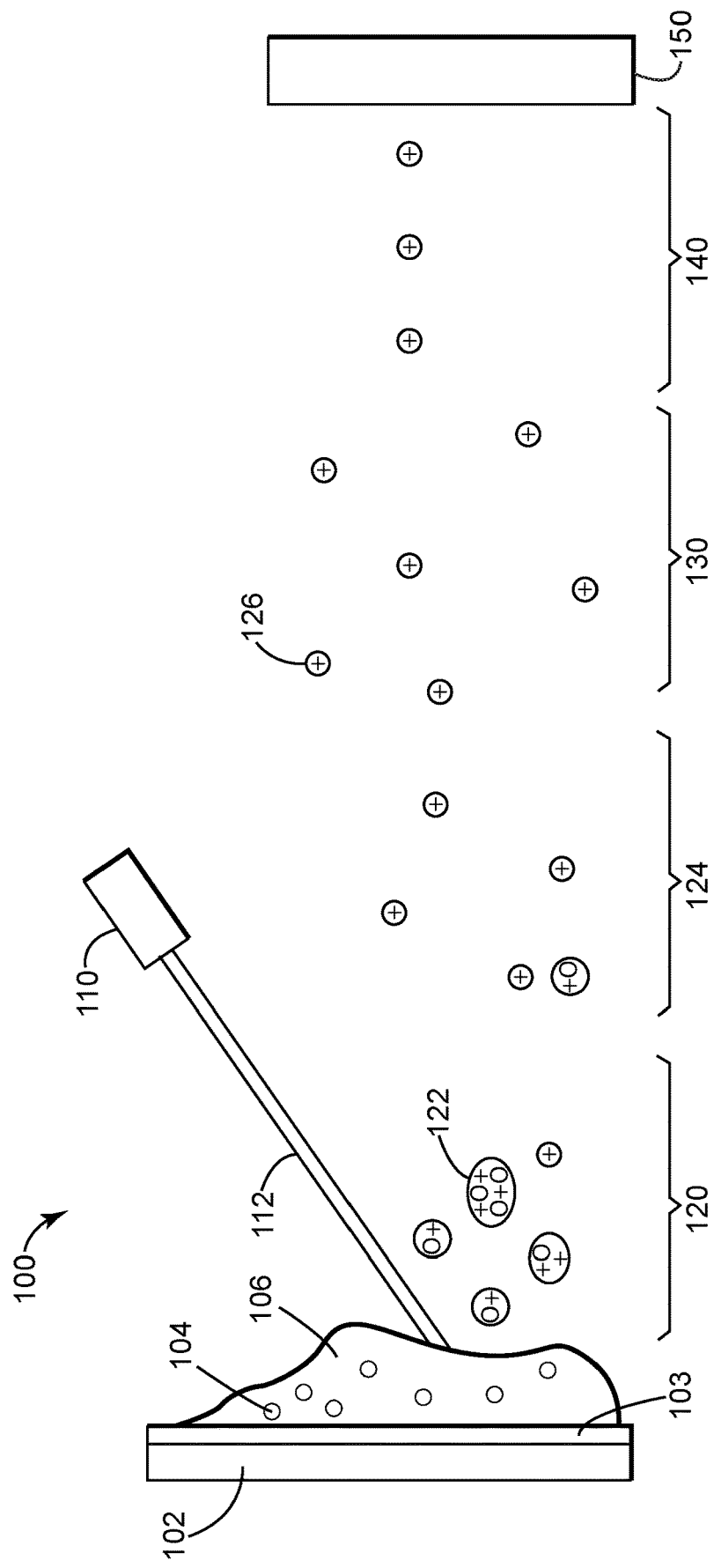
FIG. 1 illustrates a matrix-assisted laser desorption/ionization (MALDI) system.
Figure 2B:
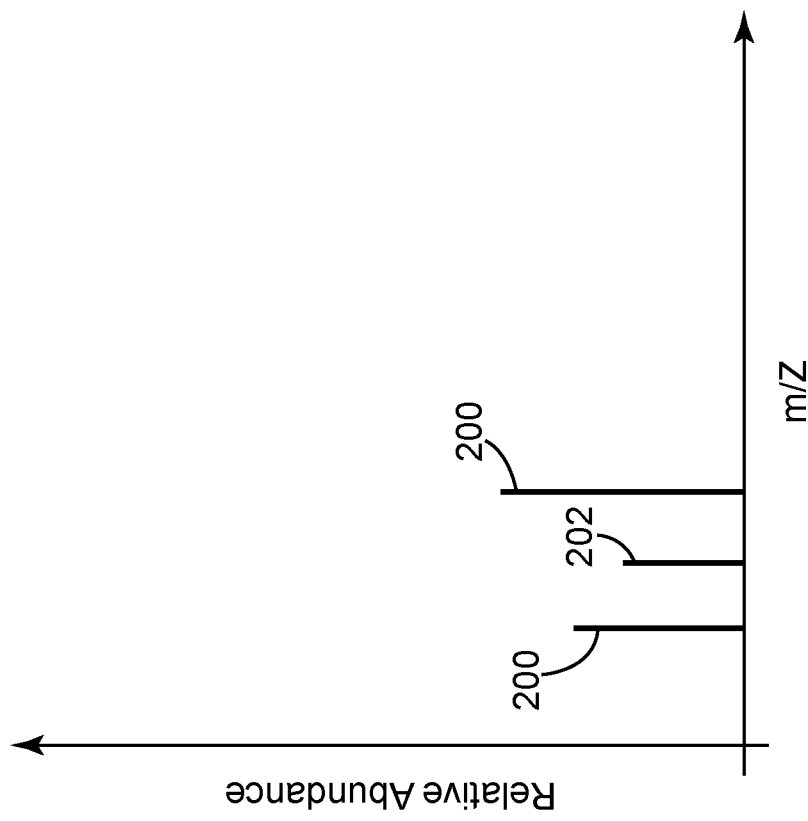
FIGS. 2A and 2B illustrate the mass spectrum for a given target material that has a low-mass comparable with the mass of the matrix.
Figure 2A:
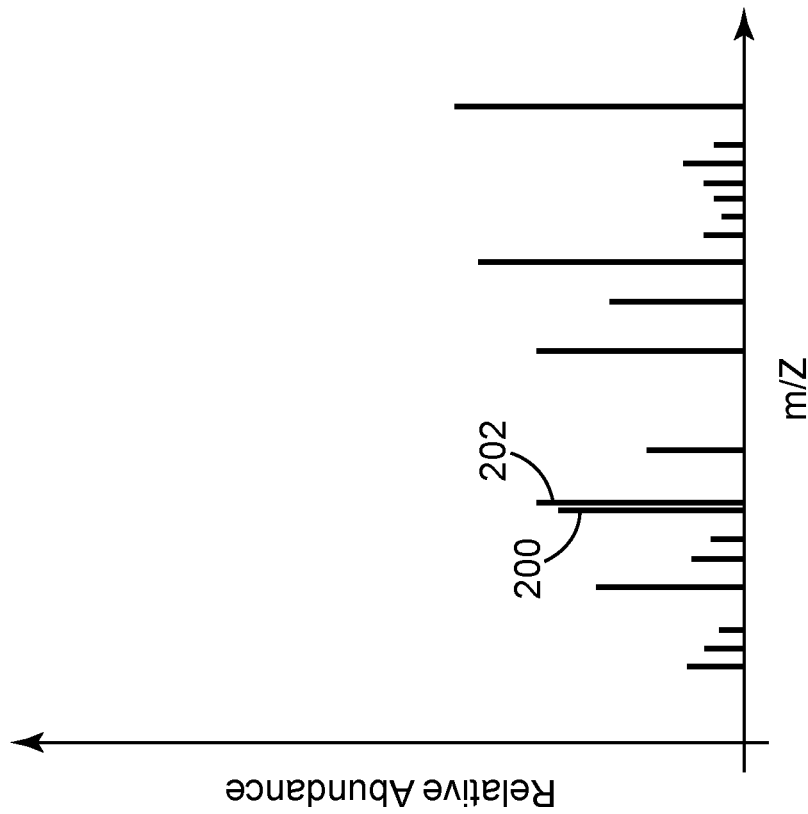

The prefabricated polymer layer 300 having the sample 310 is now ready to be studied with a MALDI device. While the traditional MALDI MSI and MALDI MS systems are using a metal sample holder 102, a metal or ITO (indium tin oxide) charge dissipating layer if the sample holder is non-metallic, and a non-polymeric matrix 106, as illustrated in FIG. 1, the present embodiment is combining all these layers into a single polymeric layer 300, which reduces the time necessary for preparing the MALDI measurement(s).

In this embodiment, the polymeric layer 300 includes a polymeric material. The polymeric material refers to materials containing one or more polymers as sole, principal and/or minor components. The polymer consists of repeating units of one or more subunits. In one application, the polymer may be terminated by groups which differ from the subunits. The groups or subunits may include one or more of solubilizing groups, acidic groups, basic groups, or reactive groups. In another application, the polymer may be conjugated. In one embodiment, the polymer may be linear or branched. In still another application, the polymer may be crosslinked.

The subunits noted above may contain sidechains to increase the solubility of the polymeric material. The subunits may contain Lewis or Broenstedt bases to promote ionization. In one application, the subunits may contain Lewis or Broenstedt acids. In one application, the subunits may carry electron withdrawing or electron donating groups to modulate the electronic structure of the polymer. The subunits may be selected to react with specific analytes. In one application, the subunits may be conjugated.

Figure 4:
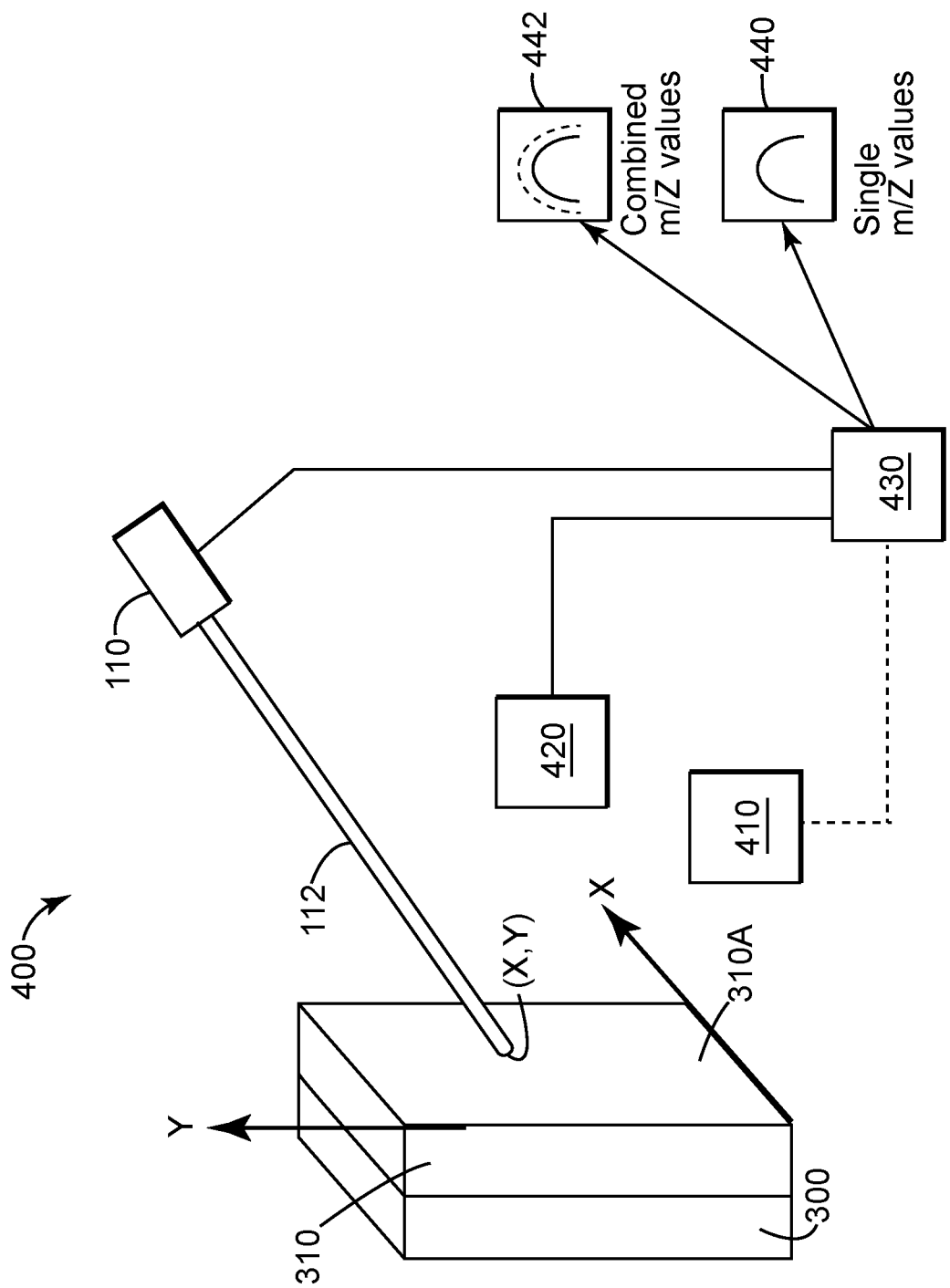
FIG. 4 illustrates a MALDI MSI system investigating a target material coated with the polymeric layer.

A MALDI MSI system 400 that uses the prefabricated polymeric layer 300 to which the target sample 310 has been attached is now discussed with regard to FIG. 4. MALDI MSI system 400 includes the target material 310, which is attached to the polymeric layer 300. As discussed above, the user of the MALDI MSI system 400 has obtained the prefabricated polymeric layer 300 and has attached the target material 310 to it.

The MALDI MSI system 400 further includes a laser 110 that sends a beam 112 onto the target material 310 and a system 420 to analyze and detect the ions created from the target material 310. The MALDI MSI system 400 might include a camera 410 for obtaining images of the target material 310. The mass spectrometry device 400 and each of its parts may be coordinated and controlled by a controller 430.

In one embodiment, the controller 430 instructs the laser 110 to send the laser beam 112 to plural locations (x, y)

along the face 310A of the target material 310 (the laser sweeps the entire surface with a desired step). A distance between two adjacent locations (x1, y1) and (x2, y2) along either axis of the face 310A may be in the range of tens of micrometers. Each location on the face 310A illuminated by the laser beam emits the fragments discussed above with regard to FIG. 1, which are then ionized, separated and measured in the corresponding parts 420. Controller 430 includes software which is programmed to associate each selected (x,y) location of the target material 310 with a corresponding measured mass spectrum (for example, a full mass spectrum). Each mass spectrum can be used individually to show the molecular composition at the corresponding (x,y) location. A multitude of mass spectra corresponding to different (x,y) locations can be combined to generate images 440 illustrating the spatial distribution of a single m/z value (where m is the mass of the ion and z is the electric charge) of the detected ions and/or images 442 illustrating combined ions of the target material. For example, the single m/z values images may be heat maps while the combined ions images may be classification images. These are the images created by the MALDI MSI system. A full mass spectrum may include hundreds or thousands of m/z values, a full image may include many hundreds or thousands or hundreds of thousands mass spectra, and an intensity of each detected ion can be plotted in these images in a false color display. The resulting set of images may be used to accurately represent the spatial distribution of the molecules that comprise the sample material.

The polymeric layer 300 may include only a single polymer, only a blend of polymers, one or more polymers blended with other materials so that the polymer mass accounts for any percentage of the total mass, or one or more polymers blended with other materials in such a way that the polymer mass accounts for about 50 to 100% of the total mass of the polymer layer.

As previously discussed, the charge dissipating layer removes the static charges that are formed on the sample holder in case that the sample holder is not made of a metal. For the present embodiment, in order that the polymeric layer 300 performs this function, the polymer material needs to be dissipating electrical charges. A charge dissipating material has a higher resistance than a charge conducting material. For example, the charge dissipating material has a resistance in the range of $10^5$ to $10^9$ Ohm while the charge conducting material has a resistance below $10^4$ Ohm. The charge dissipating layer for a MALDI device should include at least a charge dissipating material while a charge conducting material would be even better. Thus, in one application, the polymer material of the polymeric layer 300 is at least charge dissipating, which means that it has an electrical conductivity s larger than $10^{-7}$ S/cm (Siemens per centimeters). In one application, the electrical conductivity s of the polymeric layer 300 is at least $10^{-2}$ S/cm.

For some applications, for example in tumor research, it might be necessary that a user or a skilled external expert (for example a pathologist) analyses the target material 310 using optical microscopy. The usage of optical microscopy takes place outside of the MALDI MSI system 400 and might take place before or after the measurements described in the flowchart of FIG. 10. Optical microscopy uses light and thus requires all layers of the investigated sample, for example both layers 300 and 310 in FIG. 3, to be transmissive to the used wavelengths. In this regard, note that polymeric materials may be transparent, and that thin films of polymers are translucent or transparent.

The prefabricated polymeric layer 300 illustrated in FIG. 3 had the sample holder, the charge dissipating layer and the matrix formed as a single layer 300. According to another embodiment illustrated in FIG. 5A, the prefabricated polymeric layer 300 may be implemented as two different sublayers, a first sublayer 302 directly facing the target layer 310 and a second sublayer 304 coated or attached or in contact with the first layer 302. The first sublayer 302 may be the matrix, or the charge dissipating layer or may be both. Note that the sample holder layer in this and other embodiments is the bottom layer. If the first sublayer 302 is the matrix, the second sublayer 304 may act as the charge dissipating layer and the sample holder. If the first layer 302 is the charge dissipating layer, the second sublayer 304 may act as the matrix and the sample holder. If the first sublayer 302 is the matrix and the charge dissipating layer, the second sublayer 304 is the sample holder. At least one of the first and second sublayers 302 and 304 include the polymeric material discussed above with regard to the embodiment of FIG. 3. If the first sublayer 302 includes the polymeric layer, the second sublayer may not include a polymeric material. In one application, the second sublayer is transparent to the wavelengths of the camera or optical microscope 410. In one application, both the first and second sublayers include the polymeric material.

Figure 5A:
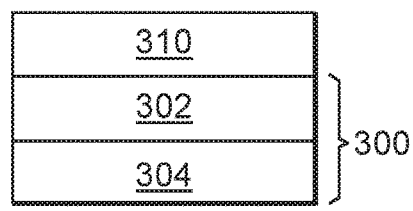
FIGS. 5A and 5B illustrate the target material coated with a polymeric layer that includes two sublayers.
Figure 5B:
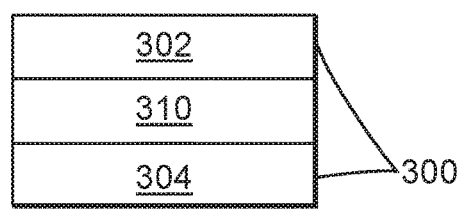

In still another embodiment illustrated in FIG. 5B, the order of the sublayers is different from the embodiment of FIG. 5A, i.e., the target material 310 is located between the first sublayer 302 and the second sublayer 304. The structure and composition of the first and second sublayers 302 and 304 in the embodiment illustrated in FIG. 5B are identical to the first and second sublayers illustrated in FIG. 5A, as long as the bottom layer includes the sample holder.

Figure 6:
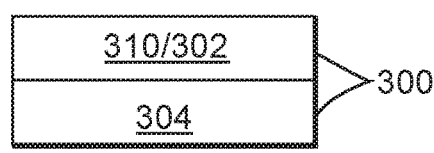
FIG. 6 illustrates the target material mixed up with a first sublayer of a polymeric layer and coated with a second sublayer of the polymeric layer.

FIG. 6 illustrates another embodiment in which the target material 310 is mixed up with the first sublayer 302 while the second sublayer 304 is coated on one side of the mixture of the target material and the first sublayer. The structure and composition of the first and second sublayers 302 and 304 in the embodiment illustrated in FIG. 6 are identical to the first and second sublayers illustrated in FIG. 5A as long as the second sublayer 304 includes the sample holder.

Figure 7A:
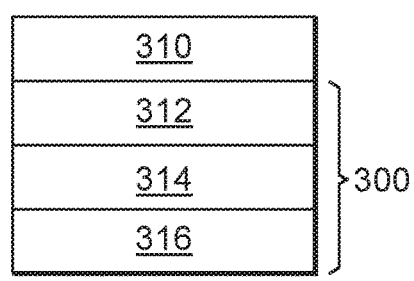
FIGS. 7A and 7B illustrate the target material coated with a polymeric layer that includes three sublayers.

FIG. 7A illustrates yet another embodiment in which the target material 310 is placed on a first sublayer 312, the first sublayer 312 is placed (e.g., coated) on a second sublayer 314, and the second sublayer 314 is placed (e.g., coated) on a third sublayer 316. The first sublayer 312 may be the matrix or the charge dissipating layer, the second sublayer 314 may be the charge dissipating layer or the matrix, and the third sublayer 316 may be the sample holder. At least one of the three sublayers 312, 314 and 316 may include the polymeric material discussed above. In one application, if only one sublayer includes the polymeric material, the other two sublayers may be transparent to the wavelength of an optical microscope. In one application, two of the sublayers 312, 314 and 316 include polymeric material. In one instance, the polymeric material of one layer may be different from the polymeric material of another layer. In still another application, each of the three sublayers 312, 314, and 316 include the polymeric material. However, in this embodiment, the three sublayers 312, 314 and 316 are distinct from each other. In one variation of this embodiment, the three sublayers may have identical chemical composition or different.

Figure 7B:
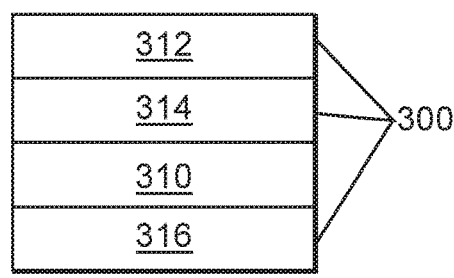

FIG. 7B shows a similar configuration and/or composition of the matrix layer, charge dissipation layer, sample holder, and target material as in the embodiment of FIG. 7A except that the target material 310 is facing one or more of the matrix layer, charge dissipation layer and the sample layer. In other words, the embodiment shown in FIG. 7B has the target material 310 sandwiched between any two of the matrix layer, charge dissipation layer and the sample layer. For this embodiment, the prefabricated polymeric material 300 may be provided, for example, sold as a kit that includes two parts, sublayers 312 and 314 attached to each other and sublayer 316 independent of the other sublayers. The user of the kit would place the target material 310 on one of the parts of the kit, and then will cover the exposed face of the target material 310 with the other part, to obtain the configuration illustrated in FIG. 7B. In one embodiment, the two parts may then be attached to each other with tape or other similar means.

Figure 8:
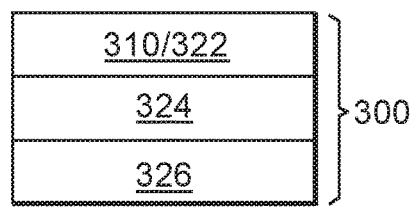
FIG. 8 illustrates the target material mixed up with a first sublayer of a polymeric layer and coated with second and third sublayers of the polymeric layer.

FIG. 8 shows another possible configuration for the polymeric layer 300. The polymeric layer 300 includes a first sublayer 322, a second sublayer 324 and a third sublayer 326. The first sublayer 322 is mixed with the target material 310 and the second sublayer 324 is placed (e.g., coated) over the mixture of the target material and the first sublayer. The third sublayer 326 is placed (e.g., coated) over the second sublayer 324.

The first sublayer 322 may be the matrix or the charge dissipating layer. The second sublayer 324 may be the charge dissipating layer or the matrix, depending on the composition of the first sublayer. The third sublayer 326 is the sample holder. As in the previous embodiments, the first, second and third sublayers may be transparent to wavelengths used by an optical microscope. At least one of the first, second and third sublayers includes the polymeric material. However, in one application two or more or the sublayers include the polymeric material. In one application, two or more of the sublayers may include different polymeric materials.

One skilled in the art would understand that the above discussed embodiments of the polymeric layer 300 may use any polymeric material. Further, the polymeric material for the charge dissipating layer needs to conduct electricity, at least as good as a charge dissipating material. No metal needs to be used for the polymeric layer. In one application, the polymeric layer does not include a glass layer or a glass layer coated with ITO.

The utilization of the polymeric materials for MALDI MSI or MALDI MS system refers to the polymeric materials being the sole, major or minor part of one or more of the sublayers making up the polymeric layer. The order in which the sublayers are formed has been discussed above with regard to the embodiments of FIGS. 3 to 8. While a traditional build-up for a MALDI system has the following order: (a) a sample holder layer; (b) a charge dissipating layer; and (c) a matrix layer, the above discussed embodiments disclose other build-up and also configurations in which one sublayer of the polymeric layer is mixed up with the target material and the remaining sublayers are coated on the mixture. One or more of the sublayers may be structured on the nano- or micro-scale.

The fabrication of the three sublayers of the polymeric layer may be based on a solution or a melt or a solid state substance. The method of fabrication may be spin-coating, or dip-coating, or spray coating, extrusion, or casting or sublimation and so on. The fabrication may consist of one or more steps. In one application, the fabrication steps may be spatially separated. In another application, the fabrication steps may be temporally separated.

Figure 9:
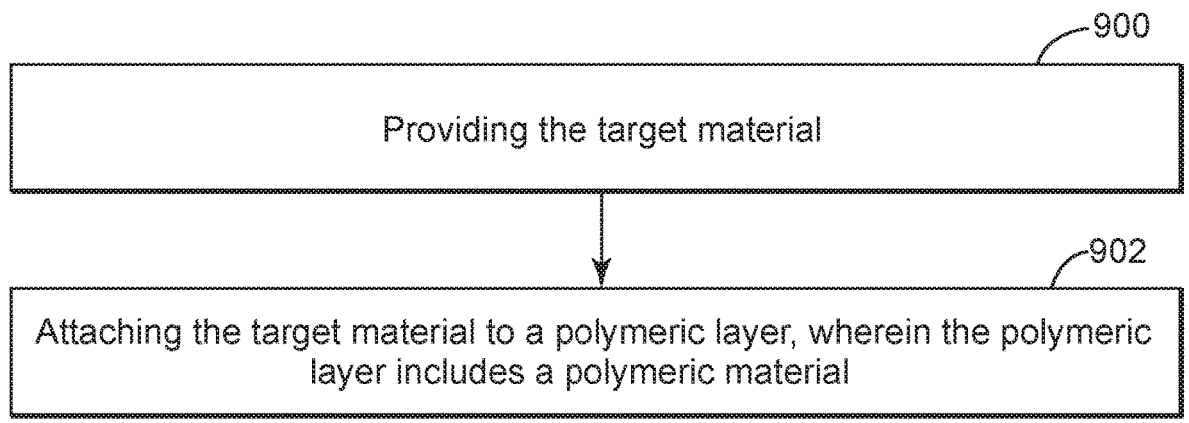
FIG. 9 is a flowchart of a method for coating the target material with a polymeric layer.

A method for preparing a target material 310 to be investigated with a matrix-assisted laser desorption/ionization (MALDI) system 400 is now discussed with regard to FIG. 9. The method includes a step 900 of providing the target material 310 and a step 902 of attaching the target material 310 to a polymeric layer 310. The polymeric layer includes a polymeric material that is electrically conductive. The polymeric layer may act a charge-dissipating layer for dissipating electrical charges that accumulate on a sample holder due to laser irradiation of the target material, as a matrix, as the sample or as a combination of any of these layers. The polymeric layer is prefabricated and thus, the user of the MALDI system is responsible for only obtaining the target material and attaching the target material to the prefabricated polymeric layer.

Figure 10:
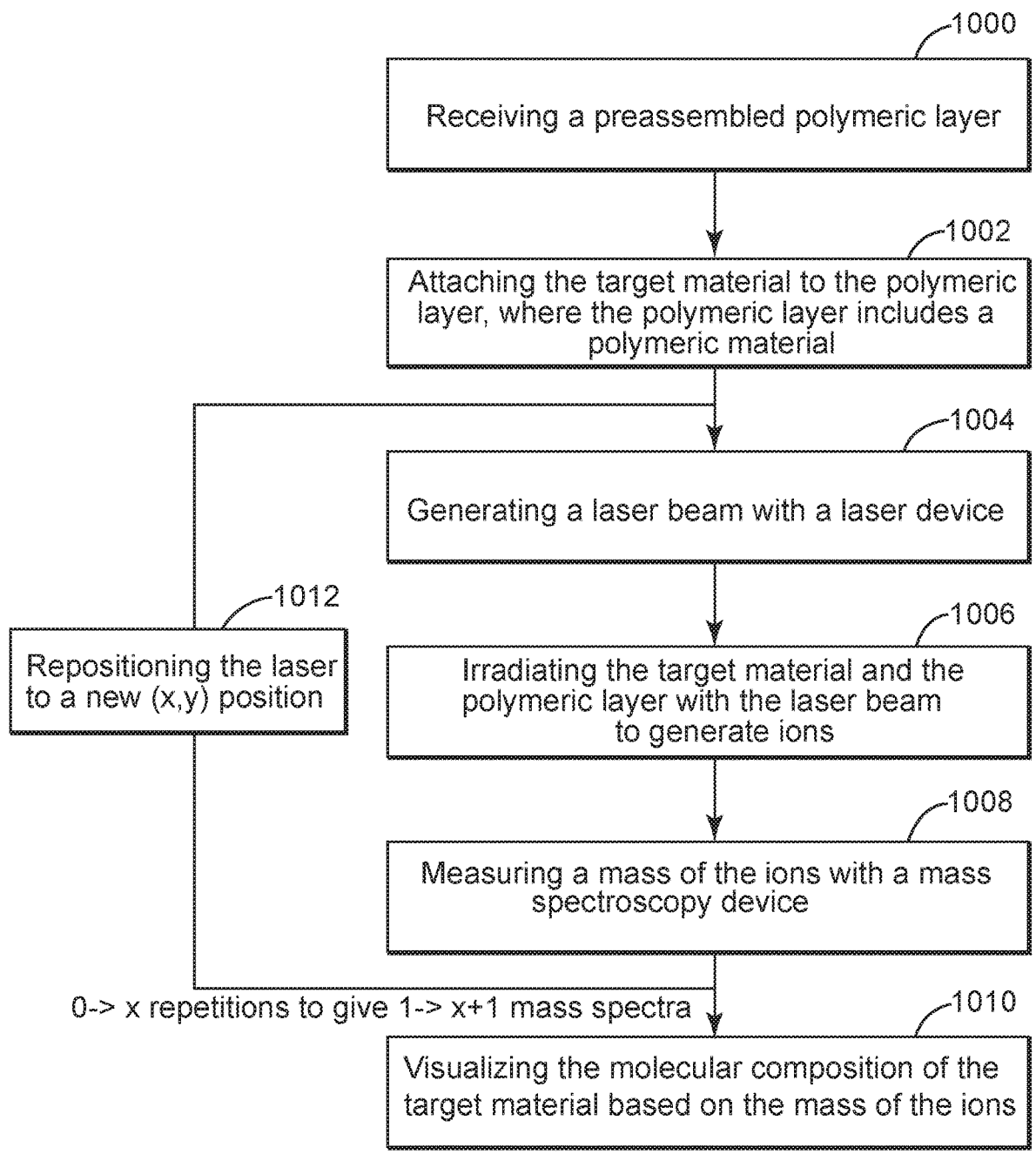
FIG. 10 is a flowchart of a method for using the target material and the polymeric layer for recording one or more mass spectra of the target material.

A method for using the polymeric layer 300 in a MALDI system is now discussed with regard to FIG. 10. The method includes a step 1000 of receiving a preassembled polymeric layer 300, and a step 1002 of attaching the target material 310 to the polymeric layer 300. In one embodiment, the polymeric layer includes a polymeric material that is transparent to wavelengths used by an optical microscope. The method further includes a step 1004 of generating a laser beam 112 with a laser device, a step 1006 of irradiating the target material 310 and the polymeric layer 300 with the laser beam 112 to generate ions, a step 1008 of measuring a mass of the ions with a mass analyzer and detector 420 and recording a mass spectrum, and a step 1010 for visualizing the molecular composition of the target material 310 based on the mass of the ions. After the step 1008, the laser can be repositioned in step 1012 to another spot on the sample material, and steps 1004 to 1008 can be repeated for each new spot. The step 1010 can visualize one mass spectrum or many mass spectra.

Figure 11:
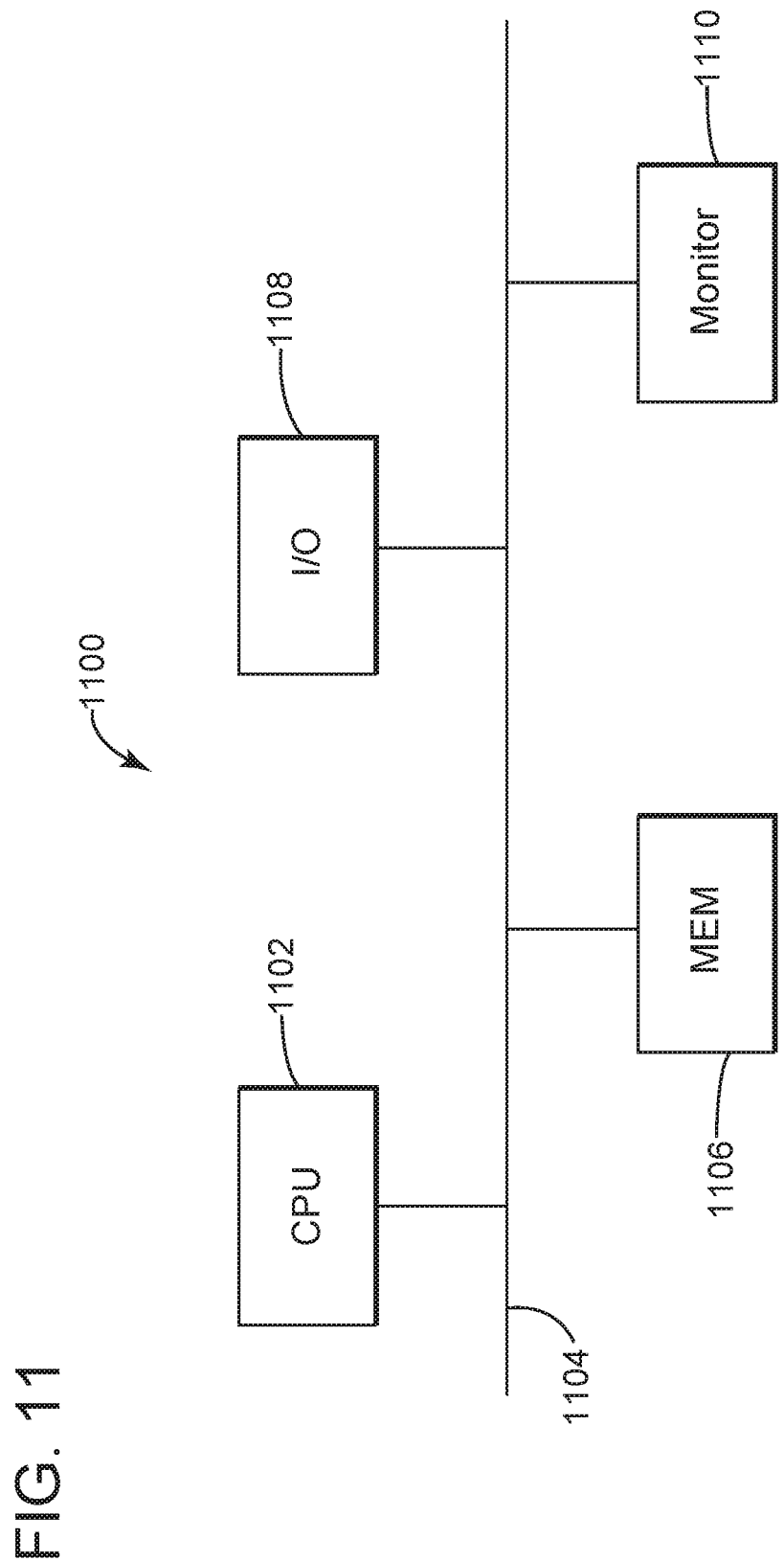
FIG. 11 is a schematic diagram of a controller configured to control the MALDI system.

The controller 430 discussed with regard to FIG. 4 may be implemented in a computing device as illustrated in FIG. 11. The computing device 1100 includes a processor 1102 that is connected through a bus 1104 to a storage device 1106. Computing device 1100 may also include an input/output interface 1108 through which data can be exchanged with the processor and/or storage device. For example, a keyboard, mouse or other device may be connected to the input/output interface 1108 to send commands to the processor and/or to collect data stored in storage device or to provide data necessary to the processor. In one application, a camera and/or a laser and/or a mass spectrometry device are connected to the input/output interface 1108 and the processor 1102 receives information from these devices and also controls them. Results of this or another algorithm may be visualized on a screen 1110, e.g., an image of the target material.

The disclosed embodiments provide methods and devices that use polymeric materials for one or more components of a MALDI MS or MALDI MSI system. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A prefabricated polymeric layer to be used in a matrix-assisted laser desorption/ionization (MALDI) based system, the prefabricated polymeric layer comprising:
a first sublayer configured to act as (1) a charge dissipating layer and (2) a matrix; and
a second sublayer attached to the first sublayer, wherein the second sublayer includes a sample holder;
wherein each of the first sublayer and the second sublayer includes a polymeric material having a resistance at least between $10^5$ to $10^9$ Ohm, and
wherein the prefabricated polymeric layer is to be added to a target material to be examined by the MALDI system.

2. The polymeric layer of claim 1, wherein the prefabricated polymeric layer is pre-assembled as one single piece.

3. The polymeric layer of claim 1, wherein the polymeric material includes a single polymer.

4. The polymeric layer of claim 1, wherein the polymeric material includes two or more polymers as major components.

5. The polymeric layer of claim 1, wherein the polymeric material includes two or more polymers as minor components.

6. The polymeric layer of claim 1, wherein the polymeric material includes at least one polymer and the polymer is conjugated.

7. The polymeric layer of claim 1, wherein the polymeric material includes at least one polymer and the polymer is branched.

8. The polymeric layer of claim 1, wherein the polymeric material includes at least one polymer and the polymer is built up by repeating one or more subunits.

9. The polymeric layer of claim 8, wherein the polymeric material includes at least one polymer and the polymer is terminated by groups different from the repeating units.

10. The polymeric layer of claim 1, wherein the polymeric material includes at least one polymer and the polymer carries at least one of a solubilizing group, acidic group, basic group, or a reactive group.

11. The polymeric layer of claim 1, wherein the polymeric material includes at least one polymer and the polymer is charge dissipating or charge conducting.

12. The polymeric layer of claim 1, wherein the polymeric material includes at least one polymer and the polymeric material is translucent or transparent.

13. The polymeric layer of claim 1, wherein the target material is sandwiched between the first and second sublayers.

14. The polymeric layer of claim 1, further comprising:
a third sublayer formed on the second sublayer,
wherein the third sublayers includes the polymeric material.

15. A method for investigating a target material, the method comprising:
receiving a preassembled polymeric layer;
attaching the target material to the preassembled polymeric layer, wherein the polymeric layer includes a first sublayer configured to act as (1) a charge dissipating layer and (2) a matrix, and a second sublayer attached to the first sublayer, wherein the second sublayer includes a sample holder, wherein each of the first sublayer and the second first sublayer includes a polymeric material having a resistance at least between $10^5$ to $10^9$ Ohm;
generating a laser beam with a laser device that is part of a matrix-assisted laser desorption/ionization (MALDI) system;
irradiating the target material and the preassembled polymeric layer with the laser beam to generate ions;
measuring a mass of the ions with a mass spectrometry device of the MALDI system; and
visualizing the molecular composition of the target material based on the mass of the ions.

16. The method of claim 15, wherein the polymeric material is charge dissipating or charge conducting.

17. The method of claim 15, wherein the polymeric material is translucent or transparent.

18. The method of claim 15, wherein the polymeric material includes a single polymer.

19. The method of claim 15, wherein the polymeric material includes two or more polymers as major components.

20. The method of claim 15, further comprising:
placing the target material between two sublayers of the preassembled polymeric layer,
wherein the two sublayers are provided as a kit.

21. A method for preparing a target material to be investigated with a matrix-assisted laser desorption/ionization (MALDI) system, the method comprising:
providing the target material; and
attaching the target material to a preassembled polymeric layer for being investigated with the MALDI system,
wherein the preassembled polymeric layer includes a first sublayer and a second sublayer attached to the first sublayer, wherein the first sublayer includes a charge dissipating layer and a matrix, and the second sublayer includes a sample holder, and
wherein each of the first sublayer and the second sublayer includes a polymeric material having a resistance at least between $10^5$ to $10^9$ Ohm.

22. The method of claim 21, wherein the polymeric material conducts or dissipates electrical charges and the polymeric material acts as a charge-dissipating layer for dissipating electrical charges that accumulate on a sample holder of the preassembled polymeric layer due to laser irradiation of the target material.

* * * * *